United States Patent
Ronan et al.

(10) Patent No.: US 10,294,863 B2
(45) Date of Patent: May 21, 2019

(54) PRELOADED AFT VENT AREA FOR LOW PRESSURE FAN DUCTS

(71) Applicant: United Technologies Corporation, Farmington, CT (US)

(72) Inventors: Michael Ronan, East Hartford, CT (US); Federico Papa, Ellington, CT (US); Joseph D. Evetts, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 665 days.

(21) Appl. No.: 14/903,324

(22) PCT Filed: Apr. 22, 2014

(86) PCT No.: PCT/US2014/034870
§ 371 (c)(1),
(2) Date: Jan. 7, 2016

(87) PCT Pub. No.: WO2015/012909
PCT Pub. Date: Jan. 29, 2015

(65) Prior Publication Data
US 2016/0376995 A1 Dec. 29, 2016

Related U.S. Application Data

(60) Provisional application No. 61/844,090, filed on Jul. 9, 2013.

(51) Int. Cl.
*F02C 7/20* (2006.01)
*F02K 1/80* (2006.01)
*B64D 33/04* (2006.01)
*F02K 1/38* (2006.01)
*F02K 1/82* (2006.01)
(Continued)

(52) U.S. Cl.
CPC ............... *F02C 7/20* (2013.01); *B64D 33/04* (2013.01); *F01D 25/14* (2013.01); *F01D 25/26* (2013.01);
(Continued)

(58) Field of Classification Search
CPC ... F02C 7/20; F02K 1/80; F02K 1/805; F02K 1/82; F02K 1/822; B64D 33/04; F01D 25/28; F01D 25/30
See application file for complete search history.

(56) References Cited

U.S. PATENT DOCUMENTS 4,696,431 A * 9/1987 Buxe ............... B64D 33/04
239/265.15
4,718,230 A * 1/1988 Honeycutt, Jr. ........ F02K 1/822
239/127.3
(Continued)

FOREIGN PATENT DOCUMENTS

FR 2920146 A1 2/2009

OTHER PUBLICATIONS

English Abstract for FR2920146A1—Feb. 27, 2009; 1 pg.
(Continued)

*Primary Examiner* — Todd E Manahan
*Assistant Examiner* — Rene D Ford
(74) *Attorney, Agent, or Firm* — Cantor Colburn LLP

(57) ABSTRACT

A core compartment aft vent is disclosed. The core compartment aft vent may include a flexible core engine cowl surrounding a core engine case. A plurality of circumferentially spaced bumpers may be disposed within the aft vent and in operative contact with the flexible core engine cowl.

6 Claims, 4 Drawing Sheets

(51) Int. Cl.
    *F02C 7/12*         (2006.01)
    *F01D 25/14*     (2006.01)
    *F01D 25/26*     (2006.01)
    *F01D 25/28*     (2006.01)
    *F02K 3/02*         (2006.01)

(52) U.S. Cl.
    CPC ............... *F01D 25/28* (2013.01); *F02C 7/12* (2013.01); *F02C 7/125* (2013.01); *F02K 1/38* (2013.01); *F02K 1/386* (2013.01); *F02K 1/822* (2013.01); *F02K 3/025* (2013.01); *F05D 2220/32* (2013.01); *F05D 2230/232* (2013.01); *F05D 2240/14* (2013.01); *F05D 2260/20* (2013.01); *F05D 2300/121* (2013.01); *F05D 2300/50212* (2013.01); *Y02T 50/675* (2013.01)

(56) References Cited

U.S. PATENT DOCUMENTS

| | | | | |
|---|---|---|---|---|
| 4,785,625 | A * | 11/1988 | Stryker | F02C 7/20 60/226.1 |
| 5,433,070 | A | 7/1995 | Amelio | |
| 5,971,000 | A | 10/1999 | Koncsek et al. | |
| 9,181,899 | B2 * | 11/2015 | Dindar | B64D 33/04 |
| 2007/0245739 | A1 * | 10/2007 | Stretton | F01D 17/105 60/728 |
| 2010/0024435 | A1 | 2/2010 | Vauchel | |
| 2011/0036068 | A1 | 2/2011 | Lefebvre et al. | |
| 2011/0138819 | A1 | 6/2011 | Tanimura | |
| 2011/0214747 | A1 | 9/2011 | Le Docte | |
| 2012/0291416 | A1 * | 11/2012 | Chiou | F02K 1/60 60/226.2 |
| 2013/0236294 | A1 * | 9/2013 | Vauchel | B64D 29/00 415/148 |

OTHER PUBLICATIONS

European Search Report for Application No. 14828758.4-1607; dated Jan. 24, 2017; 7 pgs.
International Search Report for International Application No. PCT/US2014/034870.

* cited by examiner

PRELOADED AFT VENT AREA FOR LOW PRESSURE FAN DUCTS

TECHNICAL FIELD

The subject matter of the present disclosure relates generally to gas turbine engines and, more particularly, to core compartment aft vents for gas turbine engines.

BACKGROUND

It is generally known that gas turbine engines, as used in association with many modern day aircraft, require adequate ventilation throughout the system of hot air and gases that are produced and contained within. Typically, gas turbine engines include a fan, a compressor, a combustor and a turbine. The serial flow combination of the compressor, the combustor and the turbine is commonly referred to as a core engine. Once air enters the core engine it is pressurized in the compressor. The pressurized air is then mixed with fuel in the combustor. This mixture is subsequently burned, which generates hot combustion gases that flow downstream to the turbine. In turn, the turbine extracts energy from the hot combustion gases to drive the compressor and fan. The excess hot combustion gases, not used by the turbine to drive the compressor and fan, are discharged from the core engine through an annular exhaust nozzle, which produces thrust that contributes in powering an associated aircraft. In addition to this thrust, a much larger amount of thrust is generated by the fan taking in ambient air, accelerating that air and discharging it from a fan exhaust nozzle. This thrust from the fan exhaust nozzle provides the majority of propulsion thrust for the aircraft.

The gas turbine engine has a nacelle, which includes a core engine cowl and an outer fan cowl. The core engine cowl provides an aerodynamically contoured cover for the core engine. This core engine cowl extends around the core engine and terminates at the downstream end thereof at the engine exhaust nozzle. Because the core engine cowl is radially spaced apart from the core engine, there is an area located therebetween. This area is generally referred to as the core compartment. The outer fan cowl surrounds the core engine cowl and the fan blades. In this configuration, a fan duct, which terminates downstream at the fan exhaust nozzle, is functionally defined by the area between the outer fan cowl and the core engine cowl.

As found in many engine designs, the core compartment contains various components and accessories such as those related to the hydraulic system. During operation of the engine, the core compartment, including the components and accessories, gets very hot. Overheating of the core compartment can create an adverse impact on the components and accessories therein. Thus, different ventilation systems have been used to keep the core compartment relatively cool during operation.

One example of such a ventilation system may include inlets from the fan duct to supply cold air to the core compartment. This air flow is passed through the core compartment to cool components and accessories and is then exhausted through an aft vent. Typically, under normal operating scenarios, the inlets and aft vent are sized to provide enough flow to achieve cooling objectives and maintain a desired pressure within the core compartment. Through the pressurization of the core compartment, thrust recovery is achieved through the exhaust of ventilation air from the core compartment, minimizing the efficiency penalty associated with cooling the core compartment.

Along with the design for normal operating conditions, the core compartment ventilation system must be designed to maintain safe operation during various failure scenarios. For instance, pressure relief doors have been used to vent a very large flow of hot air in the core compartment during failure case scenarios where an external duct ruptures. In these failure case systems, the pressure relief doors are located on the core engine cowl. The doors are normally closed and are triggered opened when the heat and pressure inside the core compartment becomes too great due to the ruptured external duct. With the doors open, the hot air that was contained inside the core compartment is released and continues downstream of the engine. Pressure relief doors are generally used in gas turbine engines that have a rigid core engine cowl. The doors are relatively heavy and add significant weight to the entire aircraft. In efforts to lighten the aircraft, the use of pressure relief doors has gradually been replaced with the use of flexible core engine cowls for venting of the core compartment during a failure case scenario.

The flexible core engine cowl provides the functional equivalent of pressure relief doors by deforming outwardly to allow venting of the hot air through the core compartment aft vent. The flexibility in the core engine cowl, however, causes an undesirable variation in the aft vent area during normal operating conditions. As the ventilation inlets are rigid, the reduced aft vent area during lower power operation, such as idle, produces less than the desired ventilation flow.

Thus, there is a need for an aft vent area of a core compartment that better regulates the venting of the core compartment during the different power operating conditions of an aircraft.

SUMMARY

In accordance with an aspect of the disclosure, a core compartment aft vent is provided. The aft vent may comprise a flexible core engine cowl surrounding a core engine case. The aft vent may also include a plurality of circumferentially spaced bumpers in operative contact with the flexible core engine cowl and the core engine case.

In accordance with another aspect of the disclosure, the plurality of circumferentially spaced bumpers maintains a fixed physical area located between the flexible core engine cowl and the core engine case at low pressure conditions.

In accordance with yet another aspect of the disclosure, the plurality of circumferentially spaced bumpers may be disposed on the core engine case and extend radially toward the flexible core engine cowl.

In accordance with still another aspect of the disclosure, each of the plurality of circumferentially spaced bumpers may be disposed on the flexible core engine cowl and extend radially toward the core engine case.

In accordance with still yet another aspect of the disclosure, the plurality of circumferentially spaced bumpers may be constructed from aluminum.

In further accordance with another aspect of the disclosure, the plurality of circumferentially spaced bumpers may be spaced approximately an even distance from one another.

In further accordance with yet another aspect of the disclosure, the plurality of circumferentially spaced bumpers includes four bumpers.

In further accordance with still yet another aspect of the disclosure, the plurality of circumferentially spaced bumpers may be wielded to the core engine case.

In accordance with another aspect of the disclosure, a core compartment aft vent is provided. The aft vent may comprise a flexible core engine cowl surrounding a core engine case. The aft vent may also include an annular bumper located between the flexible core engine cowl and the core engine case such that the annular bumper may be in operative association with the flexible core engine cowl.

In accordance with yet another aspect of the disclosure, the annular bumper and the flexible core engine cowl are telescopically operatively associated such that the flexible core engine cowl is capable of extending radially outwardly from the annular bumper.

In accordance with still another aspect of the disclosure, the annular bumper and the flexible core engine cowl are telescopically associated through use of slip joints.

In accordance with still yet another aspect of the disclosure, the annular bumper maintains a fixed distance from the core engine case.

In further accordance with another aspect of the disclosure, the core compartment aft vent also includes a plurality of circumferentially spaced bumpers. Each of the plurality of circumferentially spaced bumpers has one end affixed to the core engine case and another end affixed to the annular bumper.

In further accordance with yet another aspect of the disclosure, the annular bumper includes first and second semi-circular halves.

In accordance with another aspect of the disclosure, a gas turbine engine is provided. The gas turbine engine comprises a core engine case and a flexible core engine cowl, which surrounds the core engine case. The gas turbine engine also includes a core compartment aft vent defined between the flexible core engine cowl and the core engine case. A bumper is disposed within the core compartment aft vent such that the bumper is in operative contact with the flexible core engine cowl.

In accordance with yet another aspect of the disclosure, the bumper maintains a fixed physical area of the core compartment aft vent at low pressure conditions.

In accordance with still yet another aspect of the disclosure, the bumper may be constructed from aluminum.

In further accordance with yet another aspect of the disclosure, the gas turbine engine further includes a plurality of circumferentially spaced bumpers.

In further accordance with still another aspect of the disclosure, the bumper may be annular.

In further accordance with still yet another aspect of the disclosure, the bumper and the flexible core engine cowl are telescopically operatively associated such that the flexible core engine cowl is capable of extending radially outwardly from the bumper.

Various combinations of the foregoing aspects may also fit within the scope of the present disclosure. Other aspects and features of the disclosed systems and methods will be appreciated from reading the attached detailed description in conjunction with the included drawing figures.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only certain illustrative embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Figure 1:
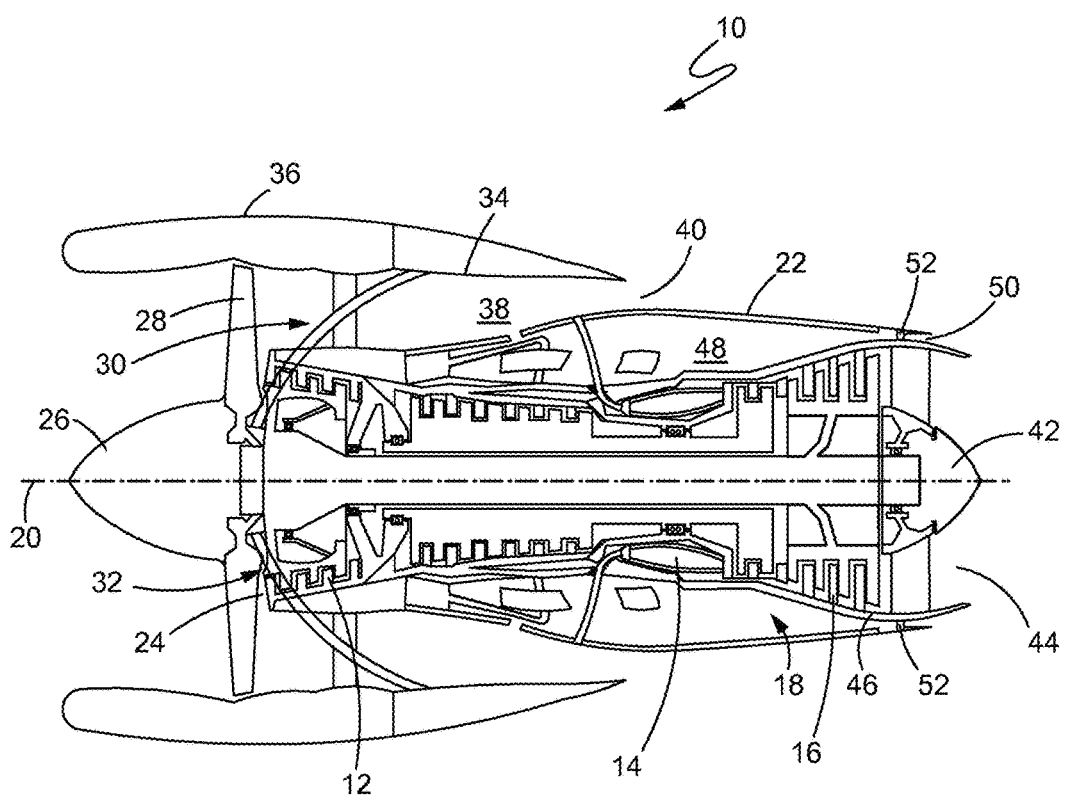
FIG. 1 is a schematic side view of a gas turbine engine with portions of the nacelle thereof sectioned and broken away to show details of the present disclosure.

Referring now to FIG. 1, a gas turbine engine constructed in accordance with the present disclosure is generally referred to by reference numeral 10. The gas turbine engine 10 includes a compressor 12, a combustor 14 and a turbine 16. The serial combination of the compressor 12, the combustor 14 and the turbine 16 is commonly referred to as a core engine 18. The core engine 18 lies along a longitudinal central axis 20. A flexible core engine cowl 22 surrounds the core engine 18.

Air enters compressor 12 at an inlet 24 and is then pressurized. The pressurized air subsequently enters the combustor 14. In the combustor 14, the air mixes with fuel and is burned, generating hot combustion gases that flow downstream to the turbine 16. The turbine 16 extracts energy from the hot combustion gases to drive the compressor 12 and a fan 26 having fan blades 28. As the turbine 16 drives the fan 26, the fan blades 28 rotate so as to take in ambient air. This process accelerates the ambient air flow 30 to provide the majority of the useful thrust produced by the engine 10. Generally, in modern gas turbine engines, the fan 26 has a much greater diameter than the core engine 18. Because of this, the ambient air flow 30 through the fan 26 can be 5-10 times higher, or more, than the combustion air flow 32 through the core engine 18. The ratio of flow through the fan 26 relative to flow through the core engine 18 is known as the bypass ratio.

The fan 26 and flexible core engine cowl 22 are surrounded by a fan cowl 34 forming part of a fan nacelle 36. A fan duct 38 is functionally defined by the area between the flexible core engine cowl 22 and the fan cowl 34. The fan duct 38 is substantially annular in shape so that it can accommodate the air flow produced by the fan 26. This air flow travels the length of the fan duct 38 and exits downstream at a fan nozzle 40. A tail cone 42 may be provided at the core engine exhaust nozzle 44 to smooth the discharge of excess hot combustion gases that were not used by the turbine 16 to drive the compressor 12 and the fan 26. The core engine exhaust nozzle 44 is the annular area located between the tail cone 42 and a core engine case 46, which surrounds the core engine 18. The core engine case 46, as such, is surrounded by the flexible core engine cowl 22.

Moreover, flexible core engine cowl 22 is radially spaced apart from the core engine case 46 so that a core compartment 48 is defined therebetween. The core compartment 48 has an aft vent 50, which is located at the downstream portion of the core compartment 48 and is concentrically adjacent to the core engine exhaust nozzle 44.

Figure 2:
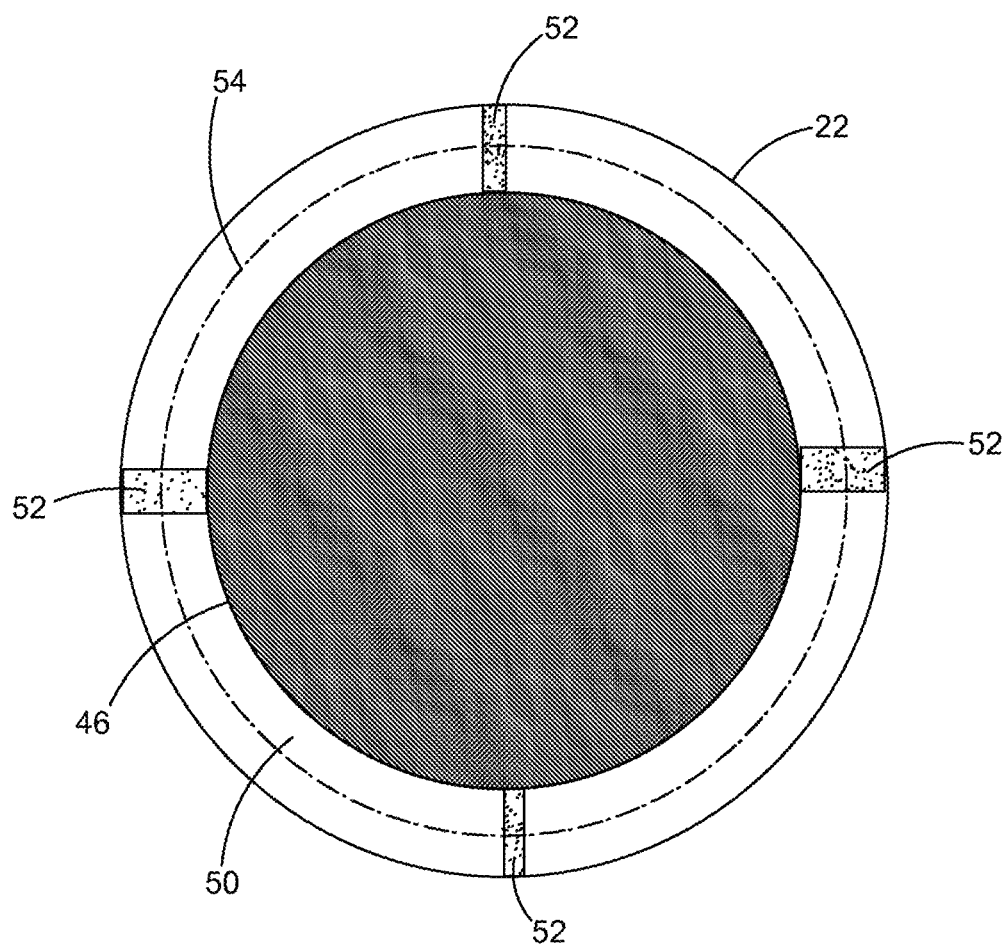
FIG. 2 is an end view of a core compartment aft vent constructed in accordance with the teachings of this disclosure.

A plurality of circumferentially spaced bumpers 52 may be disposed onto the core engine case 46 and may be spaced evenly apart from one another as illustrated in FIG. 2. For example, because the core engine case 46 may be substantially circular near the location of the plurality of circumferentially spaced bumpers 52, the four bumpers 52 shown in FIG. 2 may be approximately spaced 90 degrees from one another. Bumpers 52 extend outwardly from the core engine case 46 toward the flexible core engine cowl 22. The plurality of bumpers 52 may be riveted, welded, bolted, or embedded, among other techniques, in composite layup to the core engine case 46. In low pressure conditions, such as cruise condition and ground idle condition, the bumpers 52 are in operative contact with and support the flexible core engine cowl 22.

During common low power operation of the engine 10 without bumpers 52, ventilation flow through the core compartment 48 is reduced due to constriction of the aft vent 50. This reduces the amount of ventilation flow through the core compartment 48, resulting in increased temperatures. As pressure increases within the core compartment 48, as a function of increased engine 10 power setting, the flexible core engine cowl 22 expands radially outwardly from the core engine case 46 increasing the amount of ventilation flow and reducing temperatures within the core compartment 48.

Conventionally, without bumpers 52, at low power settings, such as ground idle, the flexible core engine cowl 22 encloses an area depicted by the dotted line 54 in FIG. 2. Subsequently, at higher power settings, such as cruise, the flexible core engine cowl 22 deflects outward radially, increasing the enclosed area, which is not ideal, as maintaining cooling flow levels while meeting target core compartment 48 pressures would dictate a relatively constant aft vent 50 area. Inclusion of bumpers 52, in accordance with the present disclosure, therefore improves upon the prior art by, among other things, allowing the aft vent 50 to maintain a physical area at ground idle condition that is similar to cruise condition.

More specifically, the bumpers 52 are disposed onto the core engine case 46 to support the flexible core engine cowl 22 near the aft vent 50 during low pressure conditions, so that the area of the aft vent 50 may meet the tolerance requirements when the engine 10 is operating at cruise condition. In this way, the pressure within the core compartment 48 at cruise and ground idle conditions will not be sufficient to actuate the flexible core engine cowl 22 and the cowl 22 will remain in operative contact with the bumpers 52. When an overpressure event occurs within the core compartment 48 the flexible core engine cowl 22 will expand outwardly from the bumpers 52 to create a larger aft vent 50 area, thus allowing the hot overpressure air flow and gases to escape. Following the overpressure event, the flexible core engine cowl 22 will return to its cruise condition/ground idle state and will once again rest on the bumpers 52 until another overpressure event occurs.

While the plurality of bumpers 52 is shown as four bumpers in FIG. 2, the number of bumpers may be less or more, including but not limited to 8 or 12 bumpers, depending on the suitable need. Although the plurality of bumpers 52 are described as being disposed on the core engine case 46, it is equally conceivable that the bumpers 52 may be disposed on the flexible core engine cowl 22, instead, to operate in the same manner. Similarly, the plurality of bumpers 52 (four in the embodiment of FIG. 2) may be spaced approximately 90 degrees apart from each another due to the substantially circular shape of the flexible core engine cowl 22. Bumpers 52 extend inwardly from the flexible core engine cowl 22 toward the core engine case 46. For instance, during an overpressure event, the flexible core engine cowl 22 with the bumpers 52 affixed thereto will expand outwardly away from the core engine case 46. After the overpressure event, the flexible core engine cowl 22 with the bumpers 52 affixed thereto will return to the cruise/ground idle state so that the bumpers 52 will come into operative contact with the core engine case 46 again.

Figure 3:
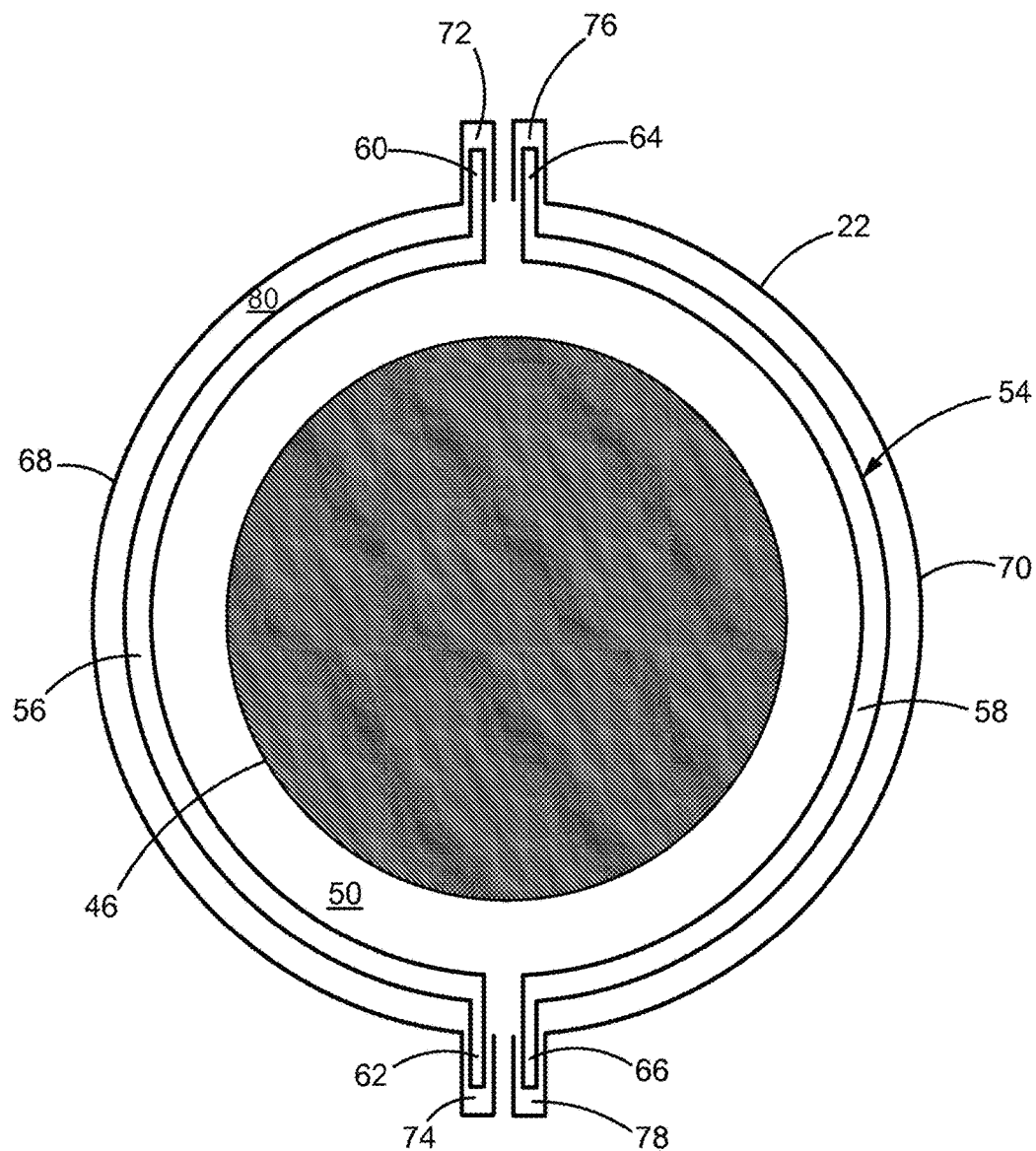
FIG. 3 is an end view of a core compartment aft vent with an annular bumper constructed in accordance with this disclosure.

In an alternative embodiment as shown in FIG. 3, the plurality of circumferentially spaced bumpers 52 is replaced with an annular substantially circumferential bumper 54. The annular bumper 54 is substantially circular and is positioned between the core engine case 46 and the flexible core engine cowl 22. The annular bumper 54 maintains a fixed aft vent 50 area between itself and the core engine case 46. Annular bumper 54 may be formed from first and second clamshell or semi-circular halves 56 and 58. The first half 56 of annular bumper 54 may be substantially semi-circular in shape and includes a first end 60 and a second end 62. The second half 58 of annular bumper 54 is also substantially semi-circular in shape and similarly includes a first end 64 and a second end 66.

For purposes of explaining this embodiment, it is important to note that the flexible core engine cowl 22 is formed of a first half section 68 and a second half section 70. The first half section 68 of the flexible core engine cowl 22 includes a first end 72 and a second end 74. Similarly, the second half section 70 of the flexible core engine cowl 22 includes a first end 76 and a second end 78. The first end 72 of the first half section 68 and the first end 76 of the second half section 70 are removably joined together. In like manner, second end 74 of the first half section 68 and the second end 78 of the second half section 70 are removably joined together.

The flexible core engine cowl 22 is in telescopically operative association with the annular bumper 54. In particular, the first end 72 is telescopically associated with first end 60. For example, first end 72 and first end 60 may be operatively associated together using slip joints or other means capable of allowing for telescopic association. Similarly, second end 74 is in telescopically operative association with second end 62, first end 76 is in telescopically operative association with first end 64 and second end 78 is in telescopically operative association with second end 66. In this example, the total number of slip joints utilized is four, but the number of slip joints may vary.

FIG. 3 depicts the engine operating at a high pressure state. In this high pressure state, the flexible core engine cowl 22 is telescopically extended radially away from the annular bumper 54, so that the aft vent 50 is expanded to include an annular gap 80 defined between the flexible core engine cowl 22 and the annular bumper 54. The excess hot gases that were trapped in the core compartment 48 exit through the annular gap 80 as well as through the fixed area between the annular bumper 54 and the core engine case 46. After the hot gases are ventilated, the flexible core engine cowl 22 telescopically contracts and returns back to its low pressure state so that the cowl 22 is in operative contact with the annular bumper 54. During low pressure conditions, the flexible core engine cowl 22 will remain in operative contact with the annular bumper 54 until another high pressure event occurs.

Figure 4:
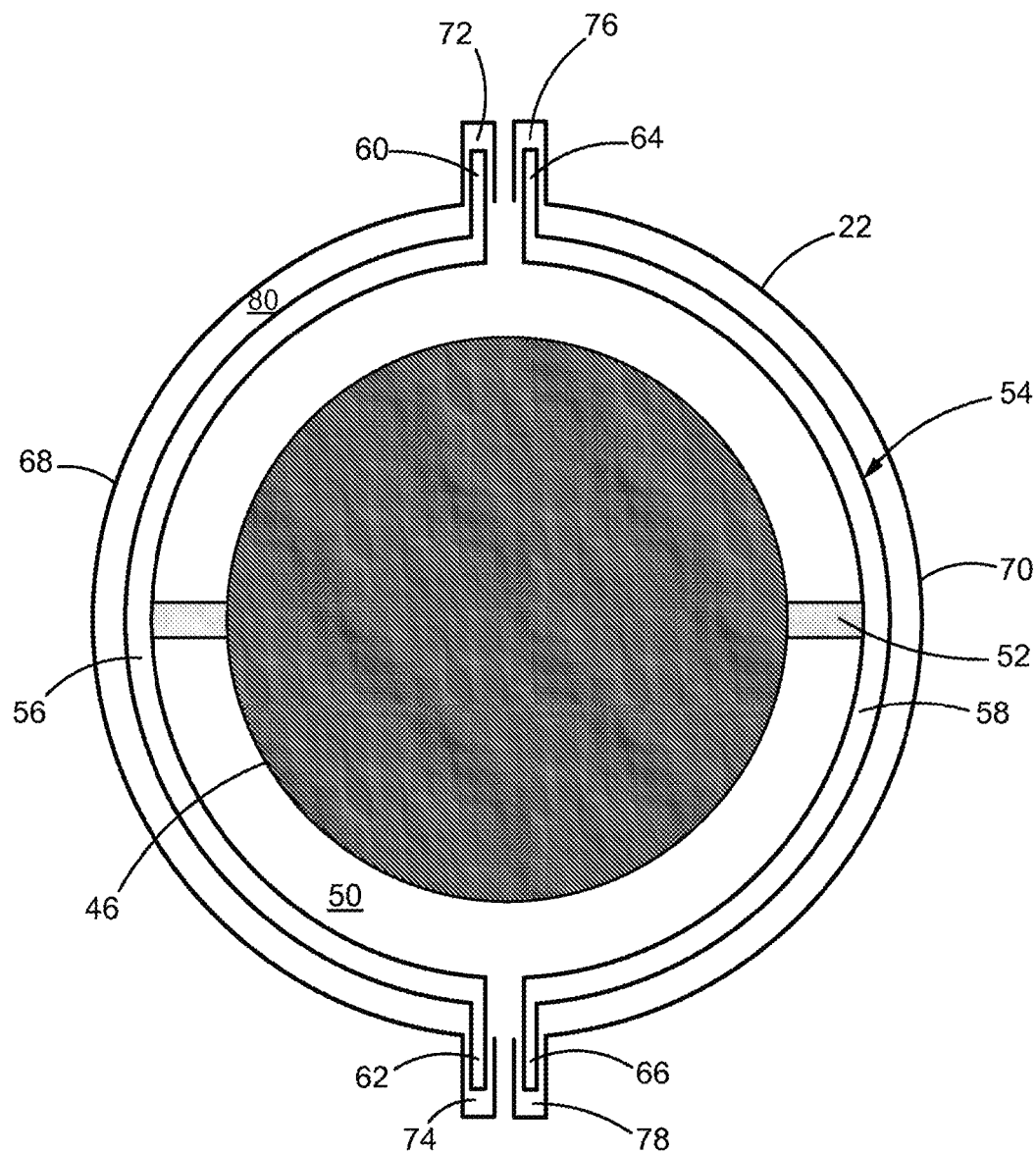
FIG. 4 is an end view of a core compartment aft vent with a plurality of bumpers constructed in accordance with this disclosure.

FIG. 4 illustrates yet another embodiment constructed in accordance with the teachings of this disclosure. As such, the annular bumper 54 is provided in combination with a plurality of circumferentially spaced bumpers 52 as an embodiment. The plurality of circumferentially spaced bumpers 52 are positioned between the core engine case 46 and the annular bumper 54. Although the plurality of circumferentially spaced bumpers 52 are shown as two bumpers in FIG. 4, the plurality of circumferentially spaced bumpers 52 may be any number of bumpers including but not limited to 4, 8 or 12. Each of the plurality of circumferentially spaced bumpers 52 has one end affixed to the core engine case 46 and the other end affixed to the annular bumper 54. The spacing location and dimensions of the plurality of circumferentially spaced bumpers 52 may vary depending on the tolerance requirements for the area of the aft vent 50 when the engine 10 is operating at low pressure conditions.

In general, the plurality of bumpers 52 and the annular bumper 54 may be fabricated out of metal such as aluminum, titanium, steel or nickel. However, this list is by no means exhaustive, and any number of different materials may be used.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A core compartment aft vent, comprising:
   a flexible core engine cowl;
   a core engine case, the core engine case surrounded by the flexible core engine cowl; and
   an annular bumper, the annular bumper located between the flexible core engine cowl and the core engine case, the annular bumper in operative association with the flexible core engine cowl,
   wherein the annular bumper and the flexible core engine cowl are telescopically operatively associated such that the flexible core engine cowl is capable of extending radially outwardly from the annular bumper.

2. The aft vent of claim 1, wherein the annular bumper and the flexible core engine cowl are telescopically operatively associated through use of slip joints.

3. A core compartment aft vent, comprising:
   a flexible core engine cowl;
   a core engine case, the core engine case surrounded by the flexible core engine cowl; and
   an annular bumper, the annular bumper located between the flexible core engine cowl and the core engine case, the annular bumper in operative association with the flexible core engine cowl,
   wherein the aft vent further includes a plurality of circumferentially spaced bumpers, each of the plurality of circumferentially spaced bumpers having one end affixed to the core engine case and another end affixed to the annular bumper.

4. A gas turbine engine, comprising:
   a core engine case;
   a flexible core engine cowl, the flexible core engine cowl surrounding the core engine case;
   a core compartment aft vent, the core compartment aft vent defined between the flexible core engine cowl and the core engine case; and
   an annular bumper, the annular bumper located between the flexible core engine cowl and the core engine case, the annular bumper in operative association with the flexible core engine cowl,
   wherein the annular bumper and the flexible core engine cowl are telescopically operatively associated such that the flexible core engine cowl is capable of extending radially outwardly from the annular bumper.

5. The gas turbine engine of claim 4, wherein the annular bumper and the flexible core engine cowl are telescopically operatively associated through use of slip joints.

6. A gas turbine engine, comprising:
   a core engine case;
   a flexible core engine cowl, the flexible core engine cowl surrounding the core engine case;
   a core compartment aft vent, the core compartment aft vent defined between the flexible core engine cowl and the core engine case; and
   an annular bumper, the annular bumper located between the flexible core engine cowl and the core engine case, the annular bumper in operative association with the flexible core engine cowl,
   wherein the gas turbine engine further includes a plurality of circumferentially spaced bumpers, wherein each of the plurality of circumferentially spaced bumpers include one end affixed to the core engine case and another end affixed to the bumper.

* * * * *